United States Patent
Leech et al.

(10) Patent No.: US 12,418,441 B2
(45) Date of Patent: Sep. 16, 2025

(54) SMART NIC/DPU TRANSLATION AGENT FOR VENDOR-SPECIFIC COMMUNICATION

(71) Applicant: Hewlett Packard Enterprise Development LP, Spring, TX (US)

(72) Inventors: Phillip Andrew Leech, Houston, TX (US); Jeffrey R. Hilland, Lago Vista, TX (US); Clark Thomas Laughlin, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 397 days.

(21) Appl. No.: 18/181,523

(22) Filed: Mar. 9, 2023

(65) Prior Publication Data

US 2024/0305502 A1 Sep. 12, 2024

(51) Int. Cl.
*H04L 12/40* (2006.01)
*H04L 12/46* (2006.01)
*H04L 41/0806* (2022.01)

(52) U.S. Cl.
CPC ...... *H04L 12/4641* (2013.01); *H04L 12/4633* (2013.01); *H04L 41/0806* (2013.01)

(58) Field of Classification Search
CPC ............. H04L 12/4641; H04L 12/4633; H04L 41/0806
USPC ........................................................ 370/401
See application file for complete search history.

(56) References Cited

U.S. PATENT DOCUMENTS 11,281,476 B2  3/2022  Thulasi et al.
2009/0215404 A1*  8/2009  Kesavan ............... H04W 48/18
                                                           455/73

FOREIGN PATENT DOCUMENTS

| CN | 111130891 A | | 5/2020 | | |
|----|----|----|----|----|----|
| CN | 118631894 A | * | 9/2024 | ......... | H04L 12/4633 |
| EP | 4412176 A1 | * | 8/2024 | ......... | H04L 12/5601 |
| WO | WO-2023097155 A1 | * | 6/2023 | ......... | G06F 9/45558 |

OTHER PUBLICATIONS

Baldi, M., et al.; "The Need for Standardization in a Thriving Network Ecosystem"; Nov. 13, 2020; 9 pages.
Leech, P., et al.; "DPU / Smart NIC Agent Supporting Redfish Data Model"; 4 page.
Redfish, "Redfish Scalable Platforms Management API Specification", Version 1.5.1, 2018, 120 pages.

* cited by examiner

*Primary Examiner* — Anthony Mejia
(74) *Attorney, Agent, or Firm* — Hewlett Packard Enterprise Patent Department

(57) ABSTRACT

As a part of a networking system, a Smart Network Interface Card (NIC)/Data Processing Unit (DPU) translation agent can be implemented by a device within a Smart NIC/DPU. The Smart NIC/DPU translation agent translates operation requests associated with a vendor-neutral API method into a vendor-specific API method, e.g., to communicate with vendor-specific firmware. The agent comprises an orchestration unit for detecting an operation request from an external entity having vendor-neutral API; and translating the operation request based upon a fabric data model; a configuration service unit for generating management commands based on the modified operation request; and a proxy service unit for receiving and translating the configuration commands to communicate with vendor-specific firmware using the vendor-specific API method.

20 Claims, 6 Drawing Sheets

SMART NIC/DPU TRANSLATION AGENT FOR VENDOR-SPECIFIC COMMUNICATION

BACKGROUND

Modern data centers include a variety of physical on-site equipment and software for information technology (IT) operations, such as storing, processing, and disseminating data and applications. For example, a modern data center may include: (1) a physical facility—the usable space for IT equipment; (2) core components configured to execute IT operations and store data and applications, e.g., data storage systems, servers, network switches and routers, and information security elements, such as firewalls; (3) support infrastructure, e.g., uninterruptible power sources, environmental controls, and physical security systems for maintaining availability; and (4) operations staff. Engineers have developed Smart Network Interface Cards ("Smart NICs")—NICs having programmable accelerators designed to make modern data center networking, security, and storage efficient and flexible; and Data Processing Units (DPUs)—fully programmable, premium processors configured to run data center communications. Smart NICs and DPUs have the potential to disrupt enterprise and cloud computing. These new adapters provide capabilities that were once only the purview of advanced networking switches and routers. For instance, an adapter can be thought of as having a built-in virtual switch with hundreds, if not thousands, of virtual network interfaces (e.g., independent MAC and/or IP addresses) which are exposed and presented to a host system as separate virtual Ethernet interfaces.

BRIEF DESCRIPTION OF THE DRAWINGS

Various objects, features, aspects and advantages of the inventive subject matter will become more apparent from the following specification, along with the accompanying drawings in which like numerals represent like components.

Figure 1:
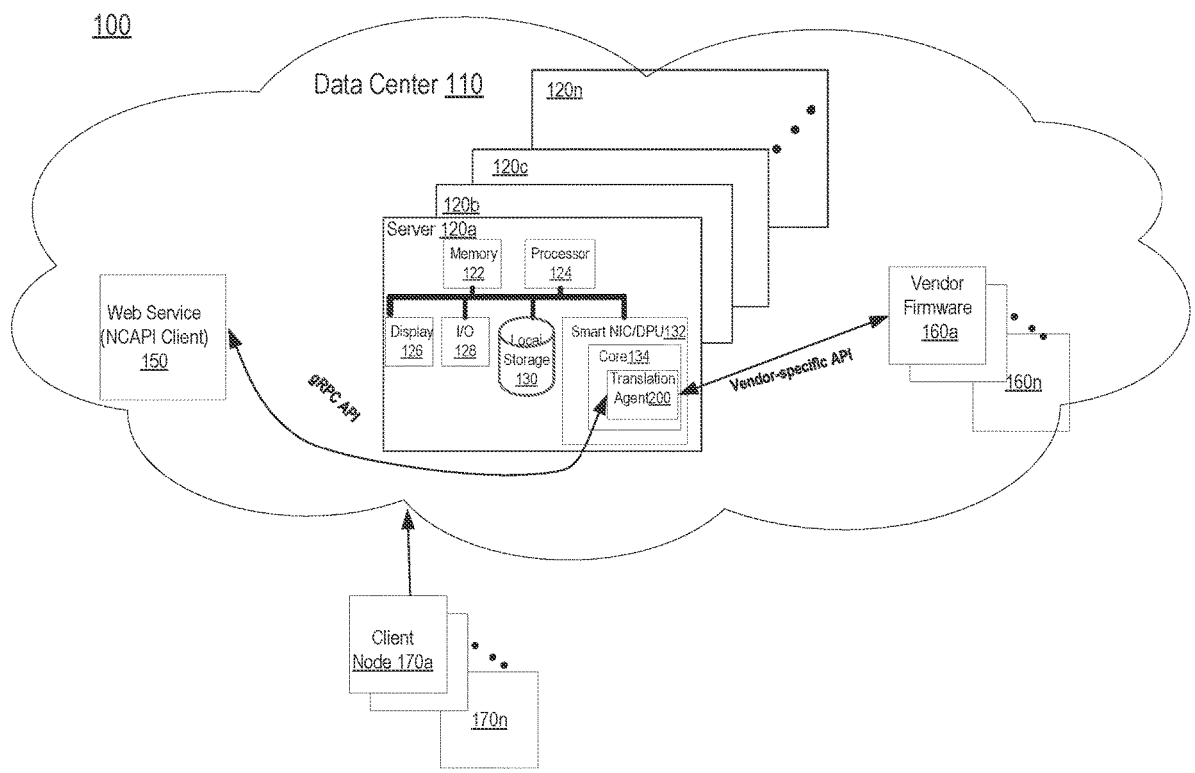
FIG. 1 illustrates a system diagram of a data center having one or more servers with a device implementing a Smart NIC/DPU agent for data processing and communication between vendor firmware and the Smart NIC/DPU, wherein the Smart NIC/DPU agent is coupled to one or more vendor firmware and a Web service client, in accordance with some examples.

While the examples are described with reference to the above drawings, the drawings are intended to be illustrative, and various other examples are consistent with the spirit, and within the scope, of this disclosure.

DETAILED DESCRIPTION

Vendors' Smart NICs have become popular because of the premium processing features they offer, including features that allow for offloading certain core processor functions in data centers. Yet, due to the fundamental differences in capabilities between the Smart NICs, DPUs, and traditional enterprise NICs, it is challenging to integrate and take advantage of these new smart I/O technologies when building out systems and subsequent higher-level enterprise and cloud computing solutions. API methods for communicating with various vendors' smart NICs are often proprietary, unique, and not standardized. In most cases, each vendor has developed proprietary hardware and software interfaces without industry guidance from their customers. Software Application Programming Interfaces (APIs) for configuration and control vary widely: transport layers are different (gRPC (Google Remote Procedure Call), REST (Representational State Transfer), etc.), API method signatures vary, and data models are vastly different. Even fundamental management functions, such as simply updating firmware, do not follow a particular standard. Thus, each operation request by an outside entity has generally required the use of a vendor-specific API method (i.e., knowledge of the format, commands, etc.).

The translation agent described herein enables a vendor-neutral API method that can be used by outside entities to seamlessly communicate with vendor-specific Smart NICs. The translation agent can listen for outside entity vendor-neutral operation requests, orchestrate/convert the vendor-neutral operation requests into vendor-specific operation requests, and implement the converted vendor-specific operation requests via a proxy service interface with the vendor-specific API(s). The translation agent may also include a telemetry service that can provide data of these interactions for traffic management, user logs, and the like. Thereby, the translation agent can improve general network capability (e.g., the capability of data center elements), relieve outside entities from the complication of vendor-specific API methods, and free up core processor resources by helping to ease the use of premium processing capabilities already included in currently available smart NICs.

The following examples describe a system, method, and device for implementing a Smart NIC/DPU translation agent for data processing and communication between vendor firmware and a Smart NIC/DPU. Specifically, this translation agent can be installed on a vendor's Smart NIC to enable an external entity to communicate with it using a vendor-neutral API method. Accordingly, this agent allows outside entities to seamlessly communicate with vendor-specific smart NICs because the translation agent converts outside entity vendor-neutral operation requests into vendor-specific operation requests to enable the controlling of the vendor's Smart NIC/DPU. It can be appreciated by one skilled in the art, that the examples may be practiced without some or all of these specific details. In other instances, well known process operations have not been described in detail in order not to unnecessarily obscure the examples.

In one example, a device implementing the Smart NIC/DPU translation agent for data processing and communication between vendor firmware and the Smart NIC/DPU resides in a DPU. As a part of a networking system, the Smart NIC/DPU translation agent prepares data for a server or client, which enables a variety of vendor firmware to communicate with a Smart NIC or DPU, e.g., to take advantage of Smart NIC/DPU features. The translation agent can be implemented within the core processor of a Smart NIC/DPU. Particularly, the agent translates a vendor-neutral API method for communicating with vendor firmware into a vendor-specific API method. The translation agent includes an orchestration unit for detecting an operation request from a web service client having vendor-neutral API, where the orchestration unit listens for API methods over HTTP/2. The orchestration unit modifies the operation request to be formatted in accordance with a fabric data model. Further, the Smart NIC/DPU translation agent includes a configuration service unit that receives the modified operation request conforming with the fabric data model and generates management commands (such as for example, configuration and control commands) for controlling an Operator underlay networking and a Tenant VPC overlay networking based upon the modified packet. The agent also includes a PROXY service unit to receive and translate the configuration commands for delivery to vendor firmware. Further, the Smart NIC/DPU translation agent includes a telemetry service unit responsible for telemetry harvesting, wherein a telemetry service (such as for example NCTELEM) collects data from the Smart NIC/DPU through vendor-specific APIs that provide telemetry data.

In some examples, the vendor-neutral API method comprises a representational state transfer web API (RESTful) data model and a high-performance Remote Procedure Call (RPC) framework. The vendor-neutral API method comprises a representational state transfer web API (RESTful) data model; wherein the RESTful data model is used for a transport layer of the high-performance RPC framework. In some systems, wherein the RESTful data model represents at least one of an operator or a tenant VPC, the RESTful data model may comprise at least one zone corresponding to a plurality of networks or subnets. The RESTful data model may include in some examples at least one endpoint having at least one address pool corresponding to a plurality of terminating host interfaces.

In some examples, the vendor-specific API method comprises a vendor-specific high-performance RPC framework API. A device for implementing the Smart NIC/DPU translation agent may further comprise a management interface configured to expose a vendor-specific API or to expose the vendor-specific API over a high-performance RPC framework.

Advantageously, the Smart NIC/DPU translation agent may be executed by at least one processor of a Smart NIC or DPU; and is configured to translate from a common vendor-neutral API method to vendor-specific API methods used by the corresponding Smart NIC/DPU. In an example, the vendor-neutral API method comprises a representational state transfer web API (RESTful) data model, and the Smart NIC/DPU translation agent enables external entities (e.g., client devices, servers, other Smart NICs/DPUs, etc.) to communicate message contents (such as for example, Smart NIC/DPU configure and control commands) using the RESTful data model without having to use vendor-specific API methods. Further, the Smart NIC/DPU agent may implement the vendor-neutral API over a high-performance Remote Procedure Call framework (such as for example, Google Remote Procedure Call (gRPC)) and, in some instances, allow for using the RESTful data model as the high-performance Remote Procedure Call framework transport layer to provide high-performance end-to-end communication services for applications. The benefits of this design include enabling an industry-standard, vendor-neutral API method, and improving network performance by helping to reduce the complexity of API method transactions caused by the proliferation of vendor-specific network hardware. The design may also be implemented by vendor-specific devices, e.g., using a same ARM core(s) as the vendor firmware.

FIG. 1 illustrates an example of a system comprising a data center that includes one or more servers and a device implementing a Smart NIC/DPU translation agent for data processing and communication between vendor firmware and a Smart NIC/DPU. System 100 includes at least one data center 110 having one or more servers 120a-n, with at least one Smart NIC/DPU translation agent 200 coupled to one or more vendor firmware 160a-n, and at least one Web service client 150, in accordance with some examples. In some examples, the web service client 150 is a Netscape Client API (NCAPI). Each one of the servers 120a-n may include one or more of the following: a memory 122, a processor 124, a display 126, an I/O device 128, local storage 130, and the Smart NIC/DPU 132, having the translation agent 200. In some example examples, one or more client nodes 170a-n are coupled to data center 110 as subscribers to cloud computing resources.

As shown in FIG. 1, the at least one Smart NIC/DPU translation agent 200 runs on one of the available Smart NIC/DPU ARM cores 134 of one or more of the servers 110a-n within data center 110. Translation agent 200 leverages the management interface provided by the one or more vendor firmware 160a-n. In one example, a Pensando Distributed Services Card (DSC) may be used to expose a vendor-specific API method over gRPC. Because each vendor's APIs, and even transport layer, can be non-standard and unique, translation agent 200, is designed to enable vendor-neutral API methods that can be translated into a of myriad of vendor-specific API methods, e.g., to configure and control Smart NIC 132, using the methods described herein. To address the need for an industry standard, vendor-neutral API data model, the Smart NIC data model of FIG. 3 has been designed so that other entities that need to configure and control Smart NIC/DPU 132 can do so through the gRPC API and can use this data model standard to form the message contents of the API methods (to be described further in detail with reference to FIG. 3).

In some examples, the vendor-neutral API method comprises a representational state transfer web API (RESTful) data model and a high-performance Remote Procedure Call (RPC) framework. In some examples, the vendor-neutral API method comprises a representational state transfer web API (RESTful) data model; wherein the RESTful data model is used for a transport layer of the high-performance RPC framework. In some systems, wherein the RESTful data model represents at least one of an operator or a tenant VPC, the RESTful data model may comprise at least one zone corresponding to a plurality of networks or subnets. The RESTful data model may include in some examples at least one endpoint having at least one address pool corresponding to a plurality of terminating host interfaces.

In some examples, the vendor-specific API method comprises a vendor-specific high-performance RPC framework API. A device for implementing the Smart NIC/DPU translation agent may further comprise a management interface configured to expose a vendor-specific API or to expose the vendor-specific API over a high-performance RPC framework.

In one example, an external entity, such as web service 150, that needs to perform configuration operations can communicate with translation agent 200 over its APIs that conform to the Smart NIC Data model standard (described in more detail with reference to FIG. 3 below). Agent 200 uses a fabric model 300 to represent an operator and tenant Virtual Private Cloud (VPC); wherein the fabric model 300 associates all of the networks as zones within the Fabric 320 and terminating Host Interfaces as endpoints 322 with address pools 325. This effectively translates the networking details, such as subnets, into a compact data model that can be expressed in a standard manner.

In some examples, the Smart NIC/DPU translation agent 200, having data processing and communication between vendor firmware and the Smart NIC/DPU, may serve as a device that communicates with web service client 150 and one or more vendor firmware 160a-n to perform the method of data processing and communication between vendor firmware and the Smart NIC/DPU described more in detail below. In other examples, Smart NIC/DPU translation agent 200 having the data processing and communication method may reside on a client node 170a-n and serve as the sole agent that performs the method of data processing and communication between vendor firmware and the Smart NIC/DPU described herein. The client nodes 170a-n and server nodes 110a-n may reside on the same LAN, or on different LANs that may be coupled together through the Internet, but separated by firewalls, routers, and/or other network devices. In one example, client nodes 170a-n, and server nodes 110a-n may couple to network (not shown) through a mobile communication network. In another example, Web service client 150, server nodes 110a-n, and vendor firmware 160a-n may reside on the same network, as shown. In some examples, Web service client nodes 170a-n, server nodes 110a-n, and vendor firmware 160a-n may reside on different networks. In some examples, the Web service client 150, server nodes 110a-n, and vendor firmware 160a-n may reside in a cloud network. Although not shown, in various examples, the client nodes 170a-n, and server nodes 110a-n may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

In operation, when web service NCAPI client 150 sends data comprising at least one operation request associated with a vendor-neutral API method, Smart NIC/DPU translation agent 200 monitors data traffic associated with internet protocol HTTP/2 and identifies at least one operation request associated with a vendor-neutral API method. Smart NIC/DPU translation agent 200 receives the at least one operation request associated with a vendor-neutral API method. Further, Smart NIC/DPU translation agent 200 modifies the at least one operation request to conform with the fabric data model in an action 418. Further, Smart NIC/DPU translation agent 200 decomposes the modified at least one operation request into a plurality of operations that act on the data associated with a vendor-specific API method, wherein the vendor-specific API method is different from the vendor-neutral API method. Specifically, Smart NIC/DPU translation agent 200 generates the plurality of operations aligning with the vendor-specific API associated with management commands for controlling an Operator underlay networking based upon the modified at least one operation request from the modified at least one operation request. Further, Smart NIC/DPU translation agent 200 generates the plurality of operations aligning with the vendor-specific API associated with management commands for controlling Tenant VPC overlay networking based upon the modified at least one operation request.

In some examples, Smart NIC/DPU translation agent 200 further interprets the one or more plurality of operations based upon vendor-specific API for implementation on vendor firmware 160(a-n). Particularly, Smart NIC/DPU translation agent 200 translates the plurality of operations associated with configuration commands and control commands into vendor-specific API methods, whereby the plurality of operations can be sent to vendor firmware 160(a-n).

In some examples, Smart NIC/DPU translation agent 200 may collect and deliver telemetry data. Smart NIC/DPU translation agent 200 may deliver the same type of data to any one of the plurality of vendor firmware 160(b).

It is appreciated that the components of operating environment of system 100 are examples; wherein more or fewer components may be present in various configurations. It is appreciated that operating environment may be part of a distributed computing environment, a cloud computing environment, a client server environment, and the like.

As would be apparent to one of ordinary skill in the art after reading this description, the various features and functionality described herein may be implemented in the Smart NIC/DPU architecture using any arrangement components necessary to perform the translation and other Smart NIC/DPU translation agent features (and functionality); and can be implemented in one or more separate or shared units in various combinations and permutations.

Figure 2:
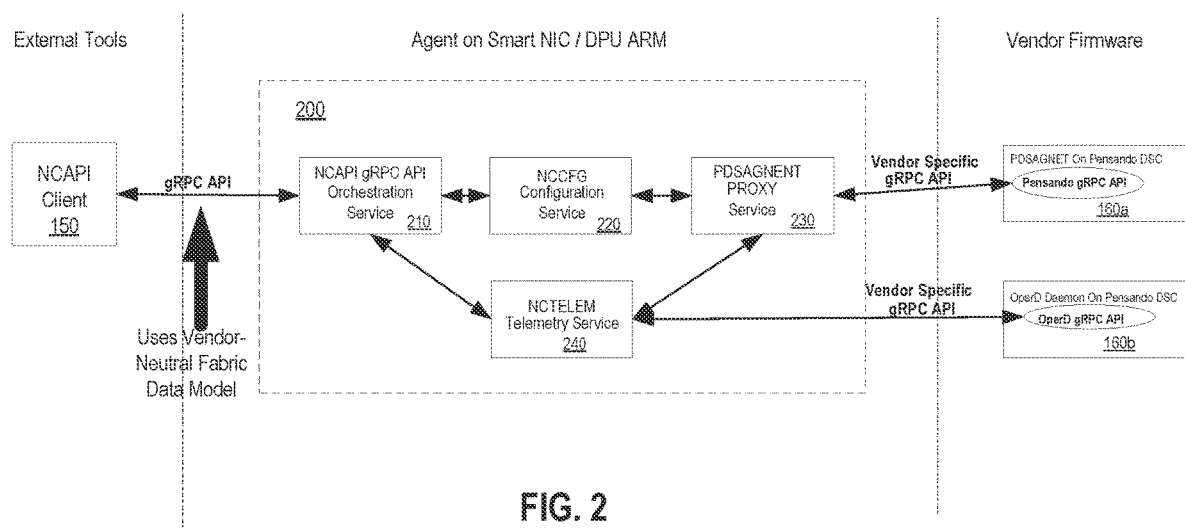
FIG. 2 illustrates an architectural block diagram of the device having the Smart NIC/DPU agent for data processing and communication between vendor firmware and the Smart NIC/DPU, coupled to one or more vendor firmware and a Web service (NCAPI) client of FIG. 1 as in some examples.

Referring to FIG. 2, an example includes an external tool such as a Web server, NCAPI client 150 coupled to the translation agent 200 on the Smart NIC/DPU 120(a-n). Further, Smart NIC/DPU translation agent 200 couples to one or more vendor firmware 160a-b. Architecturally, the primary functions of Smart NIC/DPU translation agent 200 have been divided into several services with specialized functions. As shown, in some examples of the Smart NIC/DPU translation agent 200, agent 200 includes an NCAPI gRPC API orchestration service unit 210, a NCCFG configuration service unit 220, a PDSAGNENT proxy service unit 230, and a NCTELEM telemetry service unit 240. Orchestration service unit 210 acts as a front-end and listens for API methods over HTTP/2. These API methods may implement a set of management functions, such as configuration and control functions to configure Operator underlay networking and Tenant VPC overlay networking or other management functions. Particularly, NCAPI gRPC API orchestration service unit 210 couples to receive incoming data from web server client 150 comprising at least one operation request associated with a vendor-neutral API method. Orchestration service unit 210 transforms the received data from an external entity to conform with a fabric data model. Orchestration service unit 210 is also coupled to the NCCFG configuration service unit 220 to transfer the modified data to the configuration service unit 220.

Some API methods may entail a set of complex operations, such as configuring a Tenant VPC configuration in the target Smart NIC. For operations such as these, the Agent 200 decomposes data represented in the industry-standard format into a vendor specific set of operations that act on that data. Configuration service unit 220 serves to decompose the modified at least one operation request into a plurality of operations that act on the data associated with a vendor-specific API method, wherein the vendor-specific API method is different from the vendor-neutral API method.

Further, PDSAGNENT proxy service unit 230 couples to configuration service unit 220 to further interpret and implement the one or more plurality of operations based upon vendor-specific API and transfer the same to the vendor firmware 160(a-n) in an understandable format. NCTELEM telemetry service unit 240 couples between the orchestration service unit 210 and the proxy service unit 230 for the purpose of collecting and delivering telemetry data. Telemetry service unit 240 may deliver the same type of data to any one of the plurality of vendor firmware 160(b).

In one example, Pensando vendor-specific gRPC API is comprised of dozens of unique network object types, such as subnet and Virtual NIC (VNIC), that have Create, Read, Update, and Destroy (CRUD) operations for each object. In this example, a single Tenant VPC configuration operation received as a single gRPC API method is decomposed into potentially hundreds of vendor-specific gRPC methods all of which occur locally when the vendor's management interface(s) are on the same local hardware. The benefit of this design not only includes the use of an industry-standard data model, but also improves performance by reducing the number of gRPC API method transactions over actual network hardware through the use of running on the same ARM core(s) as the vendor firmware.

In addition to handling configuration and control, the translation agent 200 also is responsible for telemetry harvesting. An additional service, the NCTELEM telemetry service unit 240 collects data from the Smart NIC/DPU through the vendor-specific gRPC APIs that provide telemetry data. Particularly, one example includes a telemetry service unit 240 that collects streaming events and metrics from the Pensando OperD Daemon, as well as polls for select telemetry data, from the Pensando management firmware 160b co-located on the Pensando DSC ARM cores.

In some examples, the data communication sent between the web service NCAPI client 150 and translation agent 200 conforms with the vendor-neutral fabric data model, which uses the gRPC API. The data communication sent between the translation agent 200 and vendor firmware 160(a-n) represents the vendor-specific gRPC API, whether the data is sent by the proxy service 230 or telemetry service 240. In one example, the vendor firmware includes Pensando gRPC API; and in another example the vendor firmware 160b includes OperD gRPC API.

In operation, when web service NCAPI client 150 sends data comprising at least one operation request associated with a vendor-neutral API method, orchestration service unit 210 of Smart NIC/DPU translation agent 200 monitors data traffic associated with internet protocol HTTP/2 and identifies at least one operation request associated with a vendor-neutral API method. Orchestration service unit 210 receives the at least one operation request associated with a vendor-neutral API method. Further, orchestration service unit 210 modifies the at least one operation request to conform with the fabric data model in an action 418. Accordingly, orchestration service unit 210 transfers the modified data to NCCFG configuration service unit 220 to decompose the modified at least one operation request into a plurality of operations that act on the data associated with a vendor-specific API method. Specifically, configuration service unit 220 couples to receive the modified at least one operation request and generates the plurality of operations aligning with the vendor-specific API associated with management commands for controlling an Operator underlay networking based upon the modified at least one operation request. Further, configuration service unit 220 generates the plurality of operations aligning with the vendor-specific API associated with management commands for controlling a Tenant VPC overlay networking based upon the modified at least one operation request.

In a first example, PDSAGNENT proxy service unit 230 couples to receive the decomposed plurality of operations from configuration service unit 220 to further interpret and implement the one or more plurality of operations based upon vendor-specific API and transfer the same to the vendor firmware 160(a-n) in an understandable format. Particularly, proxy service unit 230 couples to receive the plurality of operations associated with configuration commands and control commands and translates the plurality of operations into vendor-specific API methods, whereby the plurality of operations can be sent to vendor firmware 160(a-n). NCTELEM telemetry service unit 240 couples between the orchestration service unit 210 and the proxy service unit 230 for the purpose of collecting and delivering telemetry data. Telemetry service unit 240 may deliver the same type of data to any one of the plurality of vendor firmware 160(b).

Figure 3:
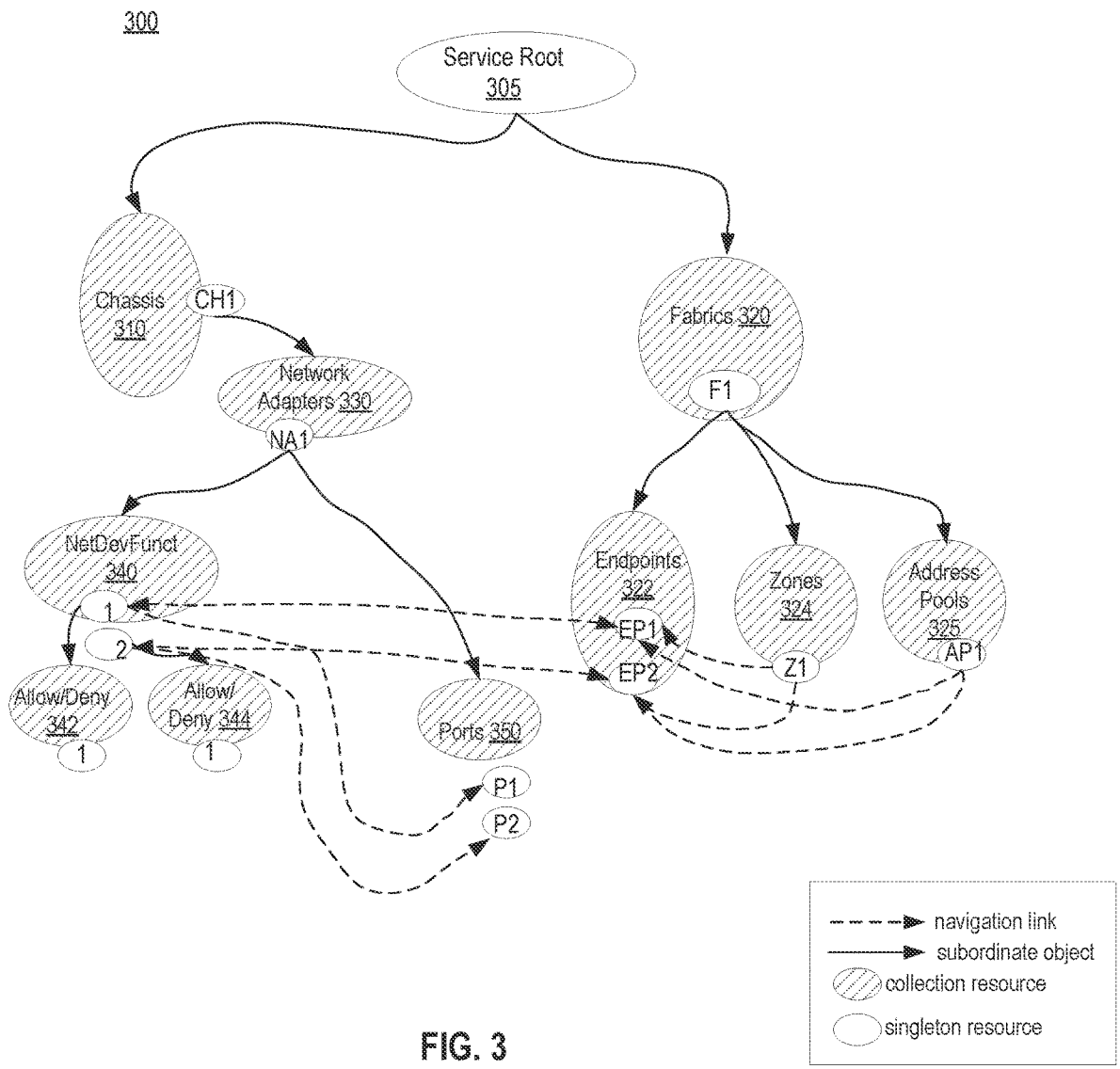
FIG. 3 illustrates a connectivity diagram of the physical topology of the fabric for a vendor-neutral data model for implementing the method of the Smart NIC/DPU agent of FIG. 1 for data processing and communication between vendor firmware and the Smart NIC/DPU in accordance with some examples.

Referring now to FIG. 3, a connectivity diagram of the physical topology of the fabric for a vendor-neutral data model for implementing the method of the Smart NIC/DPU agent of FIG. 1 for data processing and communication between vendor firmware and the Smart NIC/DPU in accordance with some examples is shown. Generally, modern datacenters consist of hundreds to thousands of different servers and storage resources used for different purposes. Often a portion of these resources are grouped into clusters that are used to work together on specific workloads. High-speed fabrics are typically used to transfer data among clustered resources to optimally satisfy the needs of the workload. Clustered resources within a datacenter can be used for a single workload or can be utilized for multiple workloads. To configure and manage clustered resources, a common data model is used that describes fabrics to management clients. The fabric data model contains methods to configure, manage, and support the lifecycle of intra-fabric connectivity of clusters of resources. The fabric data model describes the physical topology of the cluster, connectivity constraints, and isolation as well as zones to define sub-domains within a larger fabric.

In one example, the physical topology of the fabric for implementing a RESTful data model and vendor-neutral API method includes endpoints, zones, and address pools and various other resources. There are collection resources and singleton resources. Each collection resource has an associated singelton resource, as indicated by the key of the topology tree diagram. Each Fabric resource represents a fabric that is managed by the translation agent 200. There are a variety of ways to implement the physical topology of a cluster. Each fabric resource may include one or more of the following: endpoints, zones, and address pools. Endpoints include the logical representation for devices on a fabric. Zones include communication constraints for endpoints within a fabric. Address pools include addressing rules for the fabric. Specifically, service root 305 couples to chassis 310 and fabric 320. Endpoints 322, zones 324, and address pools 326 subordinate to fabric 320. Network adapters 330 subordinates to chassis 310. network development function (NetDevFunct) 340 subordinates to network adapters 330. Additionally, ports 350 subordinate to network adapters 330.

Allow/Deny resources, 342 and 344, subordinate to NetDevFunct 340. For example, the chassis collection resource 310 has a singleton resource CH1.

Chassis resource 310 contains network adapter 330 property to represent the set of available network adapters. The Port resources 350, which subordinate to the network adapters resource 330, show how a fabric network adapter provides connectivity to other devices in the infrastructure. Other resources that represent devices on a fabric, such as network adapter 330 and NetDevFunct 340, contain their own Port resources to show connectivity to the fabric. These resources can be used to configure routing information, virtual channel information, virtual LAN information, and congestion information based on the user's desired topology.

Endpoint resources 322, zone resources 324, and address pool resources 326 model communication intent across fabrics. The relationships between these resources and the endpoint resource 322 are established for managing routing and other networking configurations for the fabric. Zone resource 324 constrains communications by subdividing the fabric into a series of regions or subnets, either for the entire data center fabric or for multi-tenant access to it.

In some examples, the endpoint resource 322 represents an addressable entity, a single device, or a set of devices where traffic enters or exits the fabric 320. Traffic on a fabric flows from one endpoint to another endpoint, and the configuration of the fabric dictates routing and addressability rules for the endpoints. Systems, switches, adapters, and other components connected to the fabric 320 might contain multiple endpoints to represent the different signifying an ingress and egress points on a fabric. Endpoints 322 can represent varying types of entities on a fabric, some physical and some logical.

In some examples, Ports resource 350 represents the physical interface of an adapter or switch to a fabric. Network adapter 330 includes its own collection of ports resources 350 to represent their respective interfaces for a device, while expressing physical connectivity to a fabric or other adapters. The ports resource 350 describes the port's attributes, such as the interface speed and link status.

As to the singleton resources in one example as shown, Network Adapters collection resource 330 has a singleton resource NA1. NetDevFunct collection resource 340 has two singleton resources, 1 and 2; wherein the allow/deny collection resource 342 subordinates to the singleton resource 1 and the allow/deny collection resource 344 subordinates to the singleton resource 2. Ports collection resource 350 includes a first and second singleton resource, P1, P2. Fabrics collection resource 320 has a singleton resource F1. Endpoints collection resource 322 has a first and the second singleton resource (EP1, EP2). Zones collection resource 324 has a singleton resource Z1. Address Pools collection resource 326 has a singleton resource AP1.

As used herein, the term unit might describe a given unit of functionality that can be performed in accordance with one or more examples of the present invention. As used herein, a unit might be implemented utilizing any form of hardware, software, or a combination thereof. For example, one or more processors, controllers, ASICs, PLAs, PALs, CPLDs, FPGAs, logical components, software routines or other mechanisms might be implemented to make up a unit. In implementation, the various units described herein might be implemented as discrete units or the functions and features described can be shared in part or in total among one or more units. In other words, as would be apparent to one of ordinary skill in the art after reading this description, the various features and functionality described herein may be implemented in any given application and can be implemented in one or more separate or shared units in various combinations and permutations. Even though various features or elements of functionality may be individually described or claimed as separate units, one of ordinary skill in the art will understand that these features and functionality can be shared among one or more common software and hardware elements, and such description shall not require or imply that separate hardware or software components are used to implement such features or functionality.

Figure 4A:
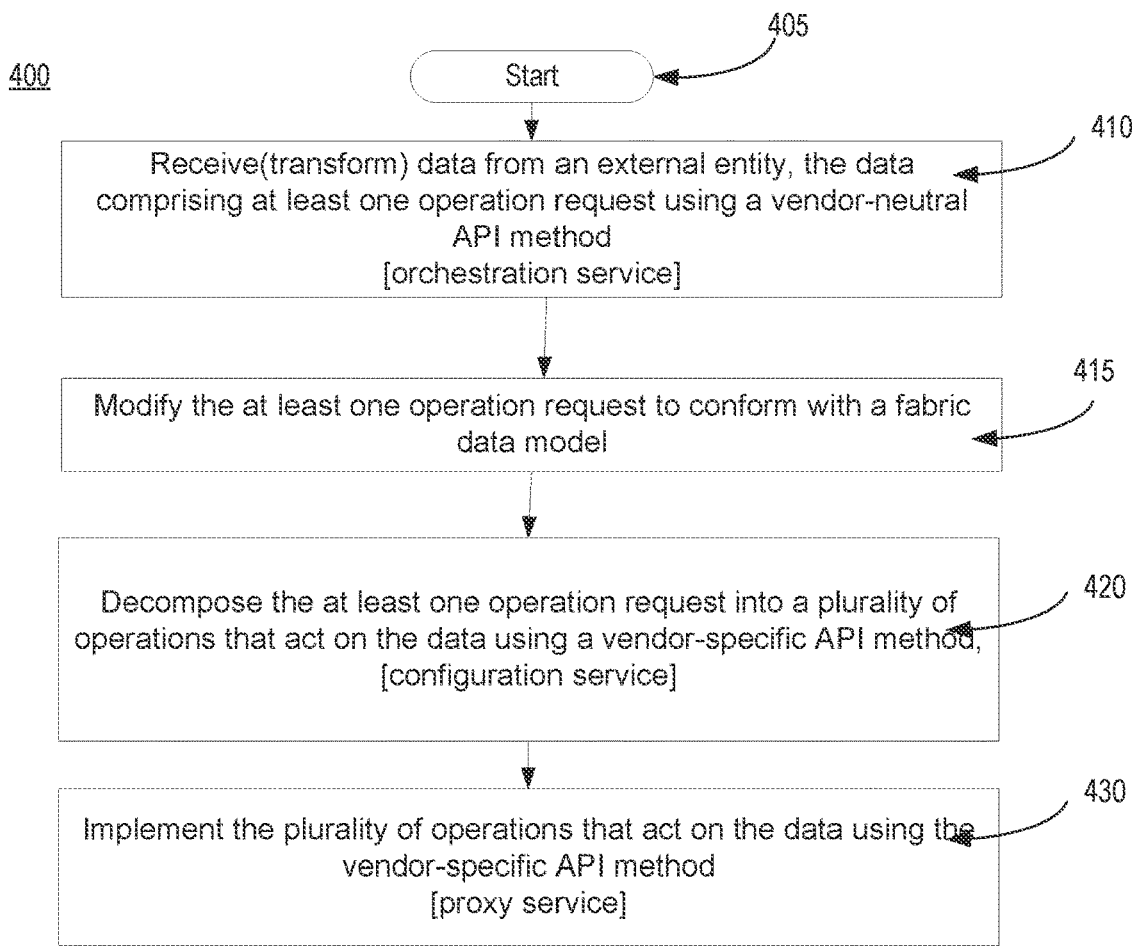
FIG. 4A illustrates a flow diagram of a method of the Smart NIC/DPU agent of FIG. 1 for data processing and communication between vendor firmware and the Smart NIC/DPU in accordance with some examples.
Figure 4B:
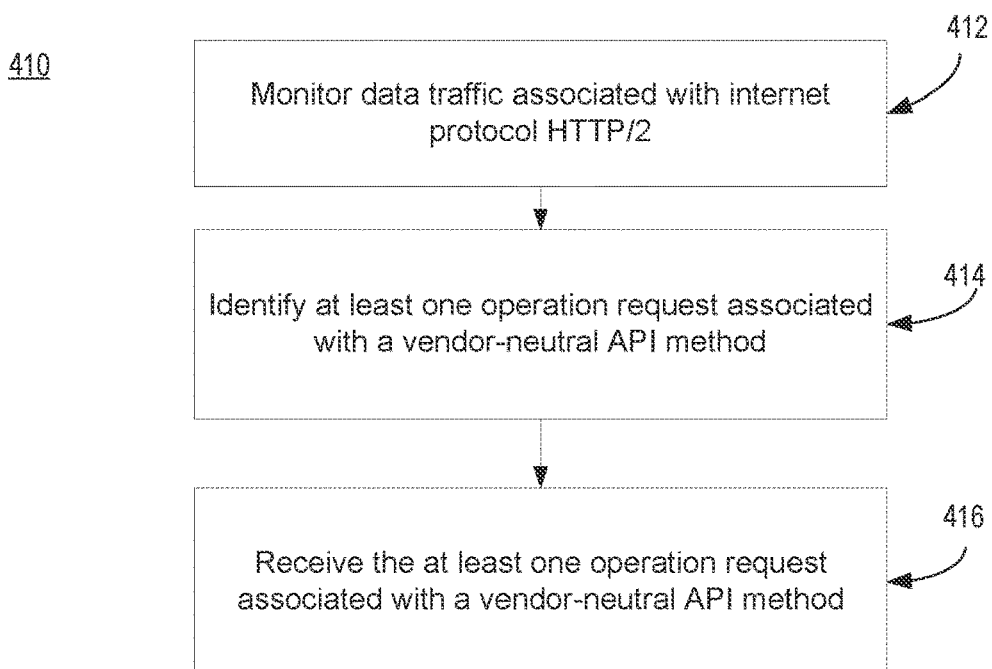
FIG. 4B illustrates a flow diagram of a method for providing the orchestration service of the method of FIG. 4A, in accordance with some examples.

Referring now to FIG. 4A, an example of a flow diagram for the method of implementing a Smart NIC/DPU translation agent for data processing and communication between vendor firmware and the Smart NIC/DPU in accordance with some examples is shown. In action 410, Smart NIC/DPU translation agent 200 may receive data from an external entity, the data comprising at least one operation request using a vendor-neutral API method and transform the received data to conform with the fabric data model. The at least one operation request comprises at least one request to configure a tenant VPC in a Smart NIC and wherein the vendor-neutral API method comprises a representational state transfer web API (RESTful) data model. For example, as shown in FIG. 4B, which represents a flow diagram for the method for providing the orchestration service of FIG. 4A, Smart NIC/DPU translation agent 200 monitors data traffic associated with internet protocol HTTP/2 (in action 412) and identifies at least one operation request associated with a vendor-neutral API method (in an action 414). In action 416, Smart NIC/DPU translation agent 200 receives the at least one operation request associated with a vendor-neutral API method. Further, Smart NIC/DPU translation agent 200 modifies the at least one operation request to conform with the fabric data model in an action 415.

Figures 4C, 4D:
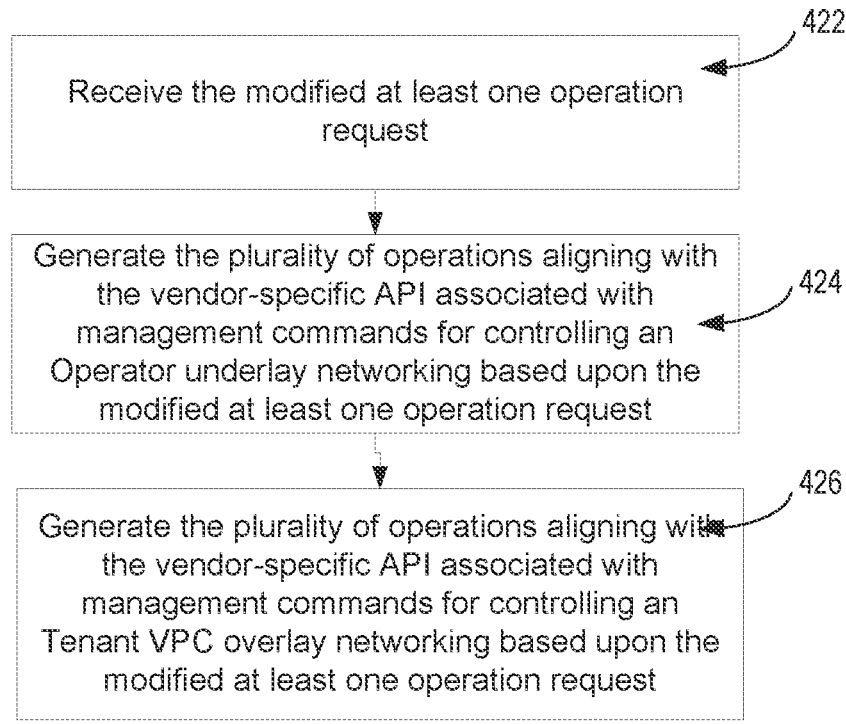
FIG. 4C illustrates a flow diagram of a method for providing the configuration service of the method of FIG. 4A, in accordance with some examples.
FIG. 4D illustrates a flow diagram of a method for providing the proxy service of the method of FIG. 4A, in accordance with some examples.

Referring back to FIG. 4A, Smart NIC/DPU translation agent 200 decomposes the at least one operation request into a plurality of operations that act on the data using a vendor-specific API method (wherein the vendor-specific API method is different from the vendor-neutral API method) in an action 420. For example, as shown in FIG. 4C, which represents a flow diagram for the method for providing the configuration service of FIG. 4A, Smart NIC/DPU translation agent 200 receives the modified at least one operation request (in an action 422) and generates the plurality of operations aligning with the vendor-specific API associated with management commands for controlling an Operator underlay networking based upon the modified at least one operation request (in an action 424). Further, in an action 426, Smart NIC/DPU translation agent 200 generates the plurality of operations aligning with the vendor-specific API associated with management commands for controlling a Tenant VPC overlay networking based upon the modified at least one operation request.

Referring back to FIG. 4A, Smart NIC/DPU translation agent 200 (in an action 430) implements the plurality of operations that act on the data using the vendor-specific API method. For example, as shown in FIG. 4D, which represents a flow diagram for the method for providing the proxy service of FIG. 4A, Smart NIC/DPU translation agent 200 receives the plurality of operations associated with configuration commands and control commands (in an action 432) and translates the plurality of operations (in an action 434). In action 436, Smart NIC/DPU translation agent 200 sends the translated plurality of operations to the vendor firmware 160(*a-n*).

Figure 5:
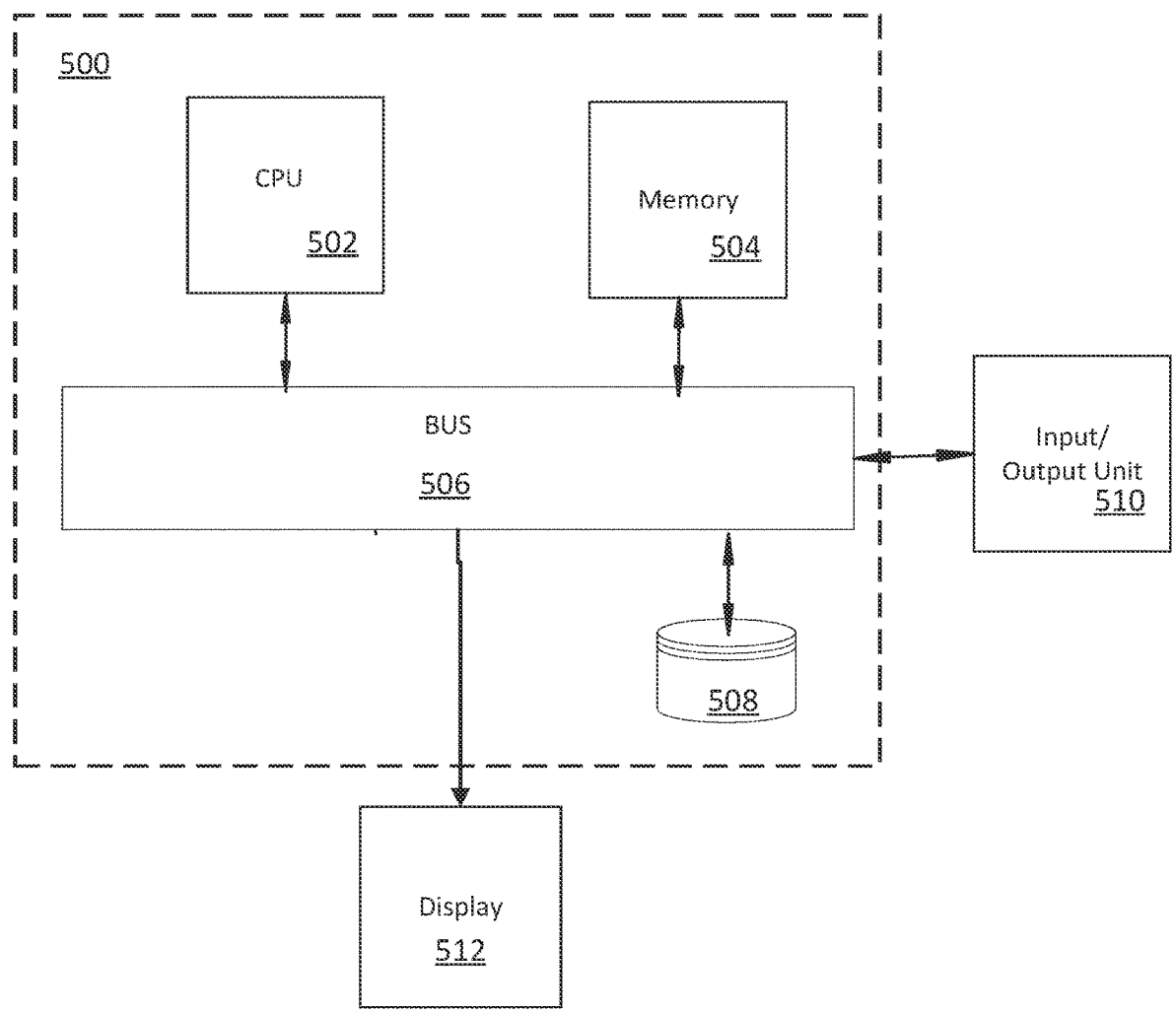
FIG. 5 is an illustration showing an example of a computing device which may implement the examples described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an example of the computing device which may implement the examples described herein. The computing device of FIG. 5 may be used to perform examples of the functionality for implementing a Smart NIC/DPU translation agent for data processing and communication between vendor firmware and the Smart NIC/DPU in accordance with some examples. The computing device includes a central processing unit (CPU) 502, which is coupled through a bus 506 to a memory 504, and mass storage device 508. Mass storage device 508 represents a persistent data storage device such as a floppy disc drive or a fixed disc drive, which may be local or remote in some examples. The mass storage device 508 could be a backup storage, in some examples. Memory 504 may include read only memory, random access memory, etc. Applications resident on the computing device may be stored on or accessed through a computer readable medium such as memory 504 or mass storage device 508 in some examples. Applications may also be in the form of modulated electronic signals modulated accessed through a network modem or other network interface of the computing device. It should be appreciated that CPU 502 may be embodied in a general-purpose processor, a special purpose processor, or a specially programmed logic device in some examples.

Display 512 is in communication with CPU 502, memory 504, and mass storage device 508, through bus 506. Display 512 is configured to display any visualization tools or reports associated with the system described herein. Input/output device 510 is coupled to bus 506 in order to communicate information in command selections to CPU 502. It should be appreciated that data to and from external devices may be communicated through the input/output device 510. CPU 502 can be defined to execute the functionality described herein to enable the functionality described with reference to FIGS. 1-4D. The code embodying this functionality may be stored within memory 504 or mass storage device 508 for execution by a processor such as CPU 502 in some examples. The operating system on the computing device may be iOS™, MS-WINDOWS™, OS/2™, UNIX™, LINUX™, or other known operating systems. It should be appreciated that the examples described herein may be integrated with virtualized computing system also.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "decomposing," "implementing," "monitoring," "identifying," "modifying," "generating," "translating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various examples also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one example" or "an example" means that a particular feature, structure, or characteristic described in connection with the example is included in at least one example of the invention. The phrase "in one example" located in various places in this description does not necessarily refer to the same example. Like reference numbers signify like elements throughout the description of the figures.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention. It is to be understood that the above description is intended to be illustrative, and not restrictive. Many other examples will be apparent to those of skill in the art upon reading and understanding the above description. Although the present invention has been described with reference to specific examples, it will be recognized that the invention is not limited to the examples described but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "|" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular examples only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above examples in mind, it should be understood that the examples might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the examples are useful machine operations. The examples also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A unit, an application, a layer, an agent or other method-operable entity could be implemented as hardware, firmware, or a processor executing software, or combinations thereof. It should be appreciated that, where a software-based example is disclosed herein, the software can be embodied in a physical machine such as a controller. For example, a controller could include a first unit and a second unit. A controller could be configured to perform various actions, e.g., of a method, an application, a layer or an agent.

The examples can also be embodied as computer readable code on a non-transitory computer readable medium. The computer readable medium is any data storage device that can store data, which can be read thereafter by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Examples described herein may be practiced with various computer system configurations including hand-held devices, tablets, microprocessor systems, microprocessor-based or programmable consumer electronics, minicomputers, mainframe computers and the like. The examples can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various examples, one or more portions of the methods and mechanisms described herein may form part of a cloud-computing environment. In such examples, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the examples and its practical applications, to thereby enable others skilled in the art to best utilize the examples and various modifications as may be suited to the particular use contemplated. Accordingly, the present examples are to be considered illustrative and not restrictive, and the invention is not to be limited to the details given herein; but, may be modified within the scope and equivalents of the appended claims.

What is claimed is:

1. A device comprising:
   at least one memory having computer-readable instructions stored thereon which, when executed by at least one processor coupled to the at least one memory, cause the at least one processor to:
   receive data from a web service client, the data comprising at least one operation request associated with a vendor-neutral Application Programming Interface (API) method, wherein the at least one operation request comprises at least one request to configure a tenant VPC in a Smart NIC and wherein the vendor-neutral API method comprises a representational state transfer web API (RESTful) data model;
   modify the at least one operation request to conform with a fabric data model;
   decompose the modified at least one operation request into a plurality of operations that act on data associated with a vendor-specific API method, wherein the vendor-specific API method is different from the vendor-neutral API method; and
   perform, the plurality of operations that act on the data using the vendor-specific API method for delivery to vendor firmware.

2. The device of claim 1, wherein the at least one processor operable to receive data, comprises:
   monitoring data traffic associated with internet protocol HTTP/2;
   identifying at least one operation request associated with a vendor-neutral API method;
   receive the at least one operation request; and
   modifying the at least one operation request to conform with the fabric data model.

3. The device of claim 1, wherein the at least one processor operable to decompose the at least one operation request, comprises:
   receiving the modified at least one operation request;
   generating the plurality of operations aligning with the vendor-specific API associated with configuration commands for configuring an Operator underlay networking based upon the modified at least one operation request; and
   generating the plurality of operations aligning with the vendor-specific API associated with control commands for controlling the Operator underlay networking based upon the modified at least one operation request.

4. The device of claim 1, wherein the at least one processor operable to perform the plurality of operations, comprises:
   receiving the plurality of operations associated with configuration commands and control commands;
   executing the plurality of operations associated with the vendor firmware; and
   sending resulting data from the executed plurality of operations to the vendor firmware.

5. The device of claim 1, wherein the vendor-neutral API method comprises a high-performance Remote Procedure Call (RPC) framework.

6. The device of claim 1, wherein the RESTful data model is used for a transport layer of the high-performance RPC framework.

7. The device of claim 1, wherein the RESTful data model represents at least one of an operator Virtual Private Cloud (VPC) or a tenant VPC.

8. The device of claim 7, wherein the RESTful data model comprises at least one zone corresponding to a plurality of networks or subnets.

9. The device of claim 8, wherein the RESTful data model comprises at least one endpoint having at least one address pool corresponding to a plurality of terminating host interfaces.

10. The device of claim 1, wherein the at least one operation request comprises at least one configuration request or control function request.

11. The device of claim 10, wherein the at least one configuration request or control function request comprises at least one request to configure a Data Processing Unit (DPU) for operator underlay networking or tenant Virtual Private Cloud (VPC) overlay networking.

12. The device of claim 1, wherein the vendor-specific API method comprises a vendor-specific high-performance RPC framework API.

13. The device of claim 1, wherein the set of operations that act on the data comprises at least one management function.

14. The device of claim 13, wherein the at least one management function comprises at least one configuration function or control function.

15. The device of claim 14, wherein the at least one configuration function or control function comprises at least one function to configure at least one of: operator underlay networking or tenant VPC overlay networking.

16. The device of claim 1, wherein the at least one processor comprises a management interface configured to expose a vendor-specific API.

17. The device of claim 16, wherein the management interface is configured to expose the vendor-specific API over a high-performance RPC framework.

18. The device of claim 16, wherein the at least one processor is further caused to obtain, using a telemetry service unit, telemetry data for a vendor-supplied network component via the vendor-specific API.

19. A method comprising:
   receiving, using an orchestration service unit, data from an external entity, the data comprising at least one operation request using a vendor-neutral API method;
   decomposing, using a configuration service unit, the at least one operation request into a plurality of operations that act on the data using a vendor-specific API method, wherein the vendor-specific API method is different from the vendor-neutral API method; and
   implementing, using a proxy service unit, the plurality of operations that act on the data using the vendor-specific API method.

20. A non-transitory computer-readable medium having instructions stored thereon, which, when executed by at least one processor, cause the at least one processor to:
   detect, using an orchestration service unit, data from an external entity, the data comprising at least one operation request using a vendor-neutral API method comprising a RESTful data model;
   translate, using a configuration service unit, the at least one operation request into a plurality of operations that act on the data using a vendor-specific API method, wherein the vendor-specific API method is different from the vendor-neutral API method; and
   execute, using a proxy service unit, the plurality of operations that act on the data using the vendor-specific API method.

* * * * *